Dec. 10, 1935.                D. HEYER                2,023,421
FLEXIBLE POWER TRANSMISSION DEVICE
Filed April 20, 1931
Fig. 1.
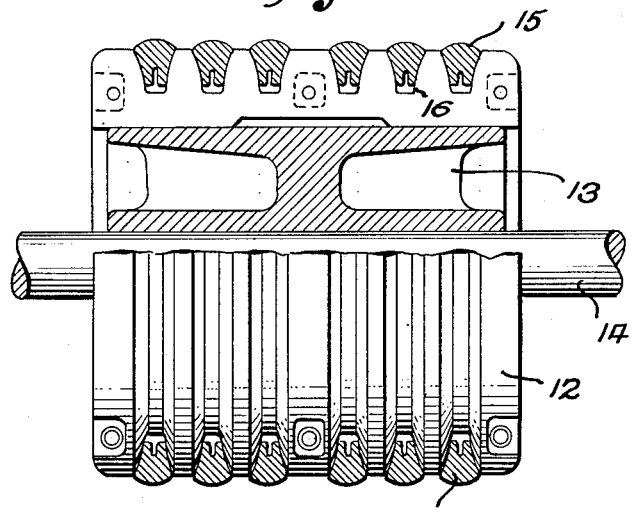
Fig. 2.
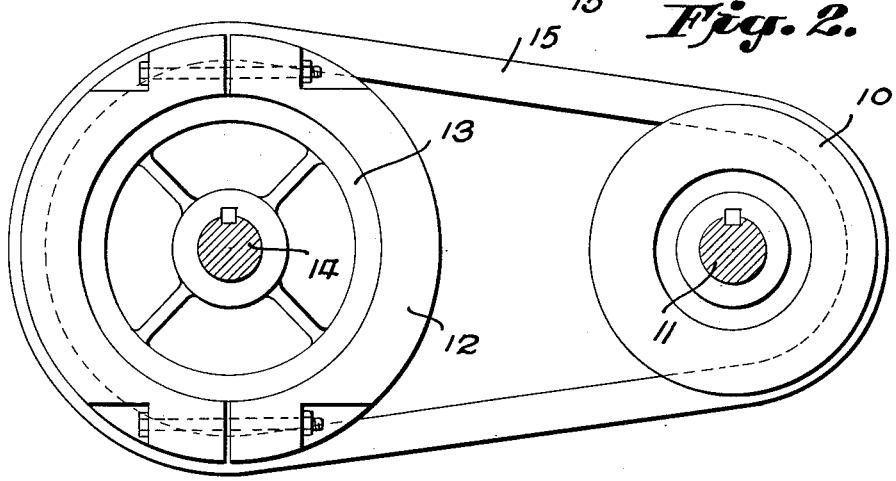
Fig. 3.   Fig. 4.   Fig. 5.
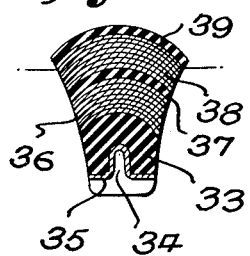 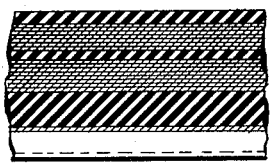
INVENTOR
DON HEYER
BY John Flam
ATTORNEY Patented Dec. 10, 1935

2,023,421

UNITED STATES PATENT OFFICE 2,023,421

FLEXIBLE POWER TRANSMISSION DEVICE

Don Heyer, Los Angeles, Calif., assignor to United States Electrical Manufacturing Company, Los Angeles, Calif., a corporation of California Application April 20, 1931, Serial No. 531,538

6 Claims. (Cl. 74—233)

My invention relates to improvements in flexible power transmission mechanisms whereby rotary motion is conveyed from a driving to a driven mechanism by means of one or more flexible elements having side driving surfaces engaging respective grooves with a curved or angular effective surface.

Previously known devices of this character have employed belts and pulleys of approximately the same V angle.

Considerable trouble is experienced with drives of this nature due to the squashing of the belts in the pulley groove resulting in unequal frictional torque. This is especially true on multiple drives as it is nearly impossible to match the belts for length and width. I have found that several of the belts convey the power and wedge excessively in the pulley grooves while the others run idle. If sudden loads are imposed on the mechanism the belts that are idling tend to throw out of the pulley grooves and often necessitate shutting-down of the driven machine. Excessive heating of the belts that are forced to carry the overload greatly shortens their life and lowers their efficiency. The belts that are idling tend to slip, necessitating constant attention to adjust for wear. As the shorter belts wear the situation is aggravated because of the fact that they loose their width and drop further in the pulley groove, causing their peripheral velocity to be less than those running on a larger periphery, and which causes a differential action resulting in unequal torque and slippage.

An object of this invention is to provide an improved flexible power transmission device; one that is capable of efficiently transmitting power without slippage or undue wear on the belt.

Another object of this invention is to provide an improved flexible power transmission device capable of quick, easy, and inexpensive application to existing mechanisms.

A further object of the present invention is to provide a flexible driving element capable of being compressed at its inner periphery without distortion of its inherent angle and capable at the same time of being expanded transversely and longitudinally on the outer peripheral section.

My invention possesses many other advantages and has other objects which may be made more easily apparent from a consideration of one embodiment of my invention. For this purpose I have shown one form in the drawing accompanying and forming part of the present specification. I shall now proceed to describe this form in detail, which illustrates the general principles of my invention; but it is to be understood that this description is not to be taken in a limiting sense, since the scope of my invention is best defined by the appended claims.

Reference is had to the accompanying drawing in which:

Figure 1 is a side view showing an application of one pulley member to replace a flat belt drive, certain portions being in section to clearly illustrate the construction and the relation of the flexible driving elements thereto.

Figure 2 is an end view of the improved flexible power transmission showing the relation of the driving and driven pulley members and the flexible driving elements engaging same.

Figure 3 is an enlarged cross-sectional view of the flexible driving element showing the relative action of same in the pulley groove and the construction thereof.

Figure 4 is an enlarged fragmentary sectional view of the flexible driving element taken longitudinally through the center.

Figure 5 is a cross-section view of a conventional V drive showing the excessive wedging or squashing action of the belt in the pulley groove.

Referring more in detail to Figures 1 and 2 of the drawing, the numeral 10 designates one pulley member of my novel flexible power transmission mechanism. For convenience in describing this member it will be referred to herein as the driving pulley, but it is to be understood that either pulley: 10 or 12, can be the driving or driven member. The driving pulley 10 may be mounted on a motor shaft 11, or other suitable driving mechanism. In the figures shown, the driven pulley is designated by numeral 12 and may be made to clamp on a flat pulley 13, or may be made to mount directly on the shaft 14 of the driven machine, similar to the manner in which pulley member 10 is mounted on shaft 11.

Flexible driving element 15 engages in grooves 16 having curved effective surfaces in the driving and driven pulley members, and transmits rotary motion from one pulley to the other by frictional contact therein.

Referring particularly to Figures 3 and 4 which show detailed construction of my preferred type of flexible element, numeral 33 indicates the rubber composition compression section. This section of the belt is subjected to considerable compression, especially when operating on small pulley diameters. For the purpose of overcoming distortion at this part of the belt, I place a channel 34 running longitudinally around the inner periphery. This channel allows the belt to expand inward while the stiffening fabric 35 tends to hold the outer surface in frictional contact with the pulley groove and to conform therewith. This channel 34 also helps to cool the compression section besides relieving the internal heat. Over the rubber section I wind layers of suitable cord material 36, under tension, to prevent stretching of the belt in service. This cord section is known as the neutral section and carries a large amount of the load. A thin layer of rubber 37 is applied to the top of the neutral section, and properly prepared bias-cut fabric 38 is wrapped thereon in successive layers, forming an arched structure. A thin layer of rubber 39 is applied over the bias-cut fabric 38 to form a protecting cover. The outer section is known as the tension section and is subjected to longitudinal stretching while flexing over the pulleys.

In Figure 5 I have shown a conventional V belt in a conventional V groove, and the distortion caused by longitudinal stretch on the tension section. The outer plies of fabric tend to dish and draw-in, thus distorting the included angle and allowing the belt to wedge excessively in the pulley groove. The compression section is forced to compress inwardly without relief, thus breaking down the structure and generating extreme internal heat.

In my improved belt construction I have overcome the tendency of the tension section to dish by reason of my arched structure and also by my method of arranging and applying the fabric. Instead of drawing-in and distorting the included angle, the tension section expands transversely and conforms to the curved effective surface of the pulley groove at all times. Thus it will be seen that I obtain frictional torque by the wedging action of my inproved flexible element in the pulley groove, and due to its inherent capacity for transverse expansion when flexing over the pulley, it achieves an augmented frictional torque.

In the compression section of my preferred type belt the longitudinal channel on the inner circumference allows the belt to compress inwardly without undue strain on the structure, and also cools the belt, avoiding the generation of destructive heat.

I prefer to build up my flexible element or belt in a collapsible mould provided with the desired included angle and so arranged as to facilitate removal of the finished article upon completion.

The arched structure of the belt is of further utility, in that it provides means whereby the belt may be successfully operated over pulleys having a very short center distance between their axes. In such constructions an idler pulley may be provided, having a concave groove which engages the arched back of the belt, and which may be suitably urged into contact with the belt to provide the necessary belt tension and to compensate for belt wear.

I claim:—

1. A vulcanized flexible power transmission element consisting of a lower compression section formed of elastic material: a center neutral section of suitable, rubberized cord material; and an outer tension section of rubberized layers of fabric material formed in an outwardly arched structure.

2. A flexible belt having opposed inclined pulley engaging side surfaces, consisting of a lower compression section formed of elastic material, a center neutral section of cord material, and an outer tension section formed of successive layers of fabric material, the individual layers of said fabric material being arched outwardly in a direction transverse to the length of the belt.

3. A vulcanized flexible belt having opposed inclined pulley engaging side surfaces, formed of a lower rubber composition section, a center effective section formed of cord material under tension, and an outer section of successive windings of bias cut fabric, the individual layers of said bias cut fabric being arched outwardly in a direction transverse to the length of the belt.

4. A flexible endless belt having opposed inclined pulley engaging side surfaces, with a lower rubber composition section having a fabric cover on the inside periphery thereof, a center effective section of cord material extending longitudinally of the belt, and an outer section of successive windings of bias cut fabric arched outwardly in a direction transverse to the length of the belt.

5. A flexible endless belt having opposed inclined pulley engaging side surfaces, formed of a lower rubber composition section having a fabric cover on the inside periphery together wtih a groove extending longitudinally of the belt, a center effective section of cord material, and an outer section of successive layers of bias cut fabric arched outwardly in a direction transverse to the length of the belt.

6. A flexible endless belt having opposed inclined pulley engaging side surfaces, with a lower rubber composition section having a fabric cover on the inside periphery together with a groove therein extending longitudinally of the belt, a center effective section of cord material, a layer of rubber over said center effective section, and an outer section of successive layers of bias cut fabric, said layers of bias cut fabric being arched outwardly in a direction transverse to the length of the belt.

DON HEYER.